(12) United States Patent
Kim et al.

(10) Patent No.: US 9,240,863 B2
(45) Date of Patent: Jan. 19, 2016

(54) APPARATUS AND METHOD FOR ESTIMATING CHANNEL IN WIRELESS COMMUNICATION SYSTEM

(71) Applicant: Samsung Electronics Co. Ltd., Suwon-si, Gyeonggi-do (KR)

(72) Inventors: Joo-Han Kim, Yongin-si (KR); Tae-Yoon Kim, Seongnam-si (KR); Chai-Man Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 14/043,203

(22) Filed: Oct. 1, 2013

(65) Prior Publication Data

US 2014/0105333 A1     Apr. 17, 2014

(30) Foreign Application Priority Data

Oct. 11, 2012 (KR) .................. 10-2012-0112875

(51) Int. Cl.
*H04K 1/10* (2006.01)
*H04L 27/28* (2006.01)
(Continued)

(52) U.S. Cl.
CPC ............ *H04L 1/0054* (2013.01); *H04L 1/0045* (2013.01); *H04L 25/022* (2013.01); *H04L 25/023* (2013.01); *H04L 25/0204* (2013.01); *H04L 25/0216* (2013.01); *H04L 25/0218* (2013.01)

(58) Field of Classification Search
CPC .................................................. H04L 27/2647
USPC ................................................. 375/260, 262
See application file for complete search history.

(56) References Cited

U.S. PATENT DOCUMENTS 8,908,496 B2 * 12/2014 Kadous ................. H03M 13/33
                                                                370/216
8,913,529 B2 * 12/2014 Walton et al. .................. 370/280
(Continued)

FOREIGN PATENT DOCUMENTS

KR    10-2007-0038552 A    4/2007

OTHER PUBLICATIONS

Liu et al., "Simple Iterative Channel Estimation in LTE Systems", Sequans Communications, Paris, France.
(Continued)

*Primary Examiner* — Qutbuddin Ghulamali
(74) *Attorney, Agent, or Firm* — Jefferson IP Law, LLP (57) ABSTRACT

An apparatus for iteratively estimating a channel in a receiver of a wireless communication system is provided. The apparatus includes a channel estimator configured to estimate a first channel value by using a pilot symbol included in a received signal, a demodulator configured to demodulate the received signal by using the first channel value, a decoding unit configured to decode the received signal demodulated by the demodulator, a feedback determining unit configured to determine whether to iteratively estimate the channel, and a feedback device configured to feed back an input value of the decoding unit when the feedback determining unit determines to iteratively estimate the channel, wherein when the feedback determining unit determines to iteratively estimate the channel, the channel estimator estimates a second channel value by using at least one of the pilot symbol included in the received signal and a data symbol received from the feedback device.

20 Claims, 9 Drawing Sheets (51) Int. Cl.
*H04L 1/00* (2006.01)
*H04L 25/02* (2006.01)

(56) References Cited

U.S. PATENT DOCUMENTS

2010/0027688 A1* 2/2010 Suh .................. H04B 7/0619
 375/260

2010/0272206 A1* 10/2010 Mazzarese ........... H04B 7/0417
 375/267

OTHER PUBLICATIONS

Ozbek et al., "Pilot-Symbol-Aided Iterative Channel Estimation for OFDM-Based Systems", Electronics and Communications Laboratory, Paris France.

* cited by examiner

APPARATUS AND METHOD FOR ESTIMATING CHANNEL IN WIRELESS COMMUNICATION SYSTEM

CROSS-REFERENCE TO RELATED APPLICATION(S)

This application claims the benefit under 35 U.S.C. §119 (a) of a Korean patent application filed on Oct. 11, 2012 in the Korean Intellectual Property Office and assigned Serial No. 10-2012-0112875, the entire disclosure of which is hereby incorporated by reference.

TECHNICAL FIELD

The present disclosure relates to estimating a channel in a wireless communication system. More particularly, the present disclosure relates to an apparatus and a method for reducing a channel estimation error

BACKGROUND

An Orthogonal Frequency Division Multiplexing (OFDM) scheme transmits data by using a multi-carrier. The OFDM scheme is a form of Multi-Carrier Modulation (MCM) scheme that converts a serial input symbol sequence into parallel symbol sequences and transmits the same through respective orthogonal subcarriers.

Figure 1:
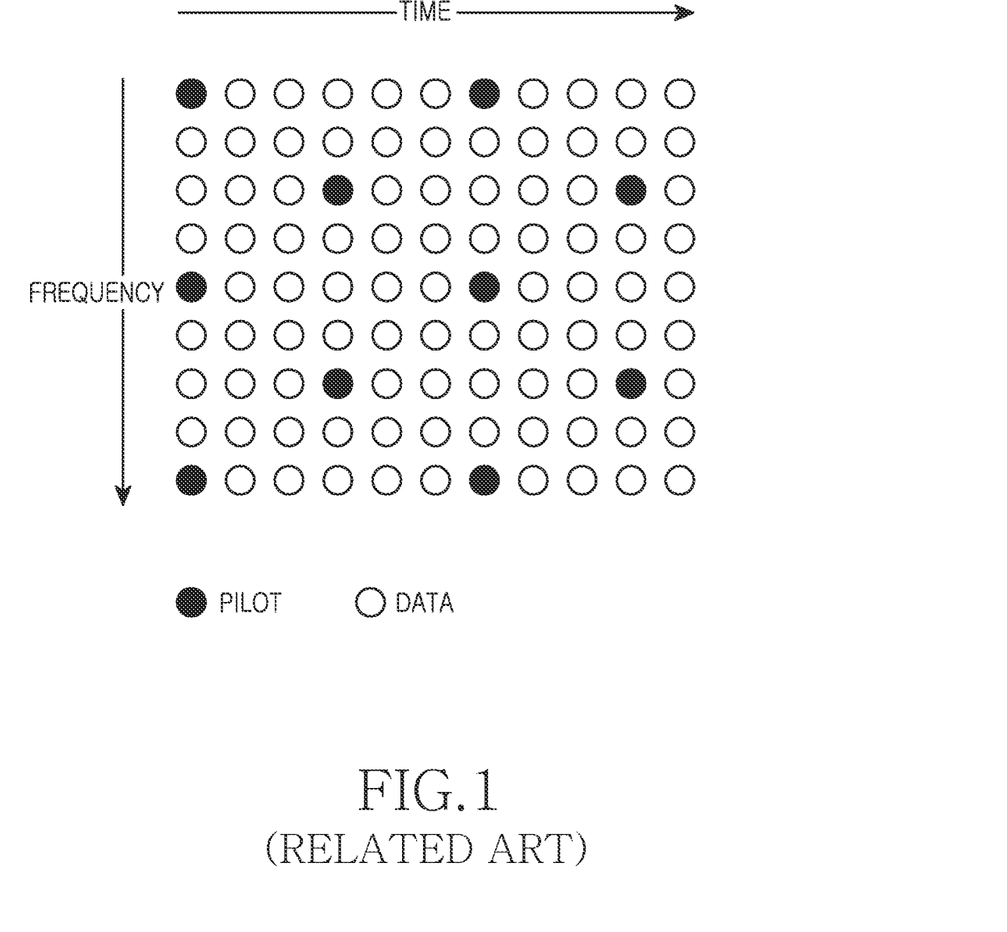
FIG. 1 is a diagram illustrating a pilot structure according to the related art.

FIG. 1 is a diagram illustrating a pilot structure according to the related art.

Referring to FIG. 1, in the OFDM scheme, a transmitter may dispose pilot symbols in a two-dimensional structure of a time (symbol) axis and a frequency (subcarrier) axis. Accordingly, as compared with other systems, a receiver is advantageous in estimating a channel having multipath fading characteristics.

The receiver demodulates and decodes a data symbol by using channel information estimated by using a pilot symbol included in a signal received from the transmitter. Accordingly, a channel estimation performance improves as the number of pilot symbols increases. However, in the wireless communication system, since the number of data symbols decreases as the number of pilot symbols increases, the number of pilot symbols allocatable to signals is limited.

When the channel estimation performance degrades due to a limited number of pilot symbols, the performance of the wireless communication system may degrade. Therefore, the wireless communication system requires a scheme for reducing a channel estimation error.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for estimating a channel in a wireless communication system.

Another aspect of the present disclosure is to provide an apparatus and a method for iteratively estimating a channel in a wireless communication system.

Another aspect of the present disclosure is to provide an apparatus and a method for iteratively estimating a channel in a wireless communication system by using an input value of a decoder.

Another aspect of the present disclosure is to provide an apparatus and a method for estimating a channel in a wireless communication system by using a pilot symbol and a data symbol according to iterative channel estimation.

Another aspect of the present disclosure is to provide an apparatus and a method for calculating a hard decision value of an input value of a decoder and feeding back the same in order to iteratively estimate a channel in a wireless communication system.

Another aspect of the present disclosure is to provide an apparatus and a method for calculating a data symbol average of an input value of a decoder and feeding back the same in order to iteratively estimate a channel in a wireless communication system.

In accordance with an aspect of the present disclosure, an apparatus for estimating a channel in a receiver of a wireless communication system is provided. The apparatus includes a channel estimator configured to estimate a first channel value by using a pilot symbol included in a received signal, a demodulator configured to demodulate the received signal by using the first channel value, a decoding unit configured to decode the received signal demodulated by the demodulator, a feedback determining unit configured to determine whether to iteratively estimate the channel according to the decoding result of the decoding unit, and a feedback device configured to feed back an input value of the decoding unit when the feedback determining unit determines to iteratively estimate the channel, wherein when the feedback determining unit determines to iteratively estimate the channel, the channel estimator estimates a second channel value by using at least one of the pilot symbol included in the received signal and a data symbol received from the feedback device.

In accordance with another aspect of the present disclosure, a method for estimating a channel in a receiver of a wireless communication system is provided. The method includes estimating a first channel value by using a pilot symbol included in a received signal, demodulating the received signal by using the first channel value, decoding the demodulated received signal, determining whether to iteratively estimate the channel according to the decoding result, generating a data symbol corresponding to an input value of a decoding unit for the decoding when determining to iteratively estimate the channel, and estimating a second channel value by using at least one of the data symbol and the pilot symbol included in the received signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure relates to an apparatus and a method for iteratively estimating a channel in a wireless communication system.

Hereinafter, a description will be given of a scheme for iteratively estimating a channel in a wireless communication system according to an embodiment of the present disclosure.

Figure 2:
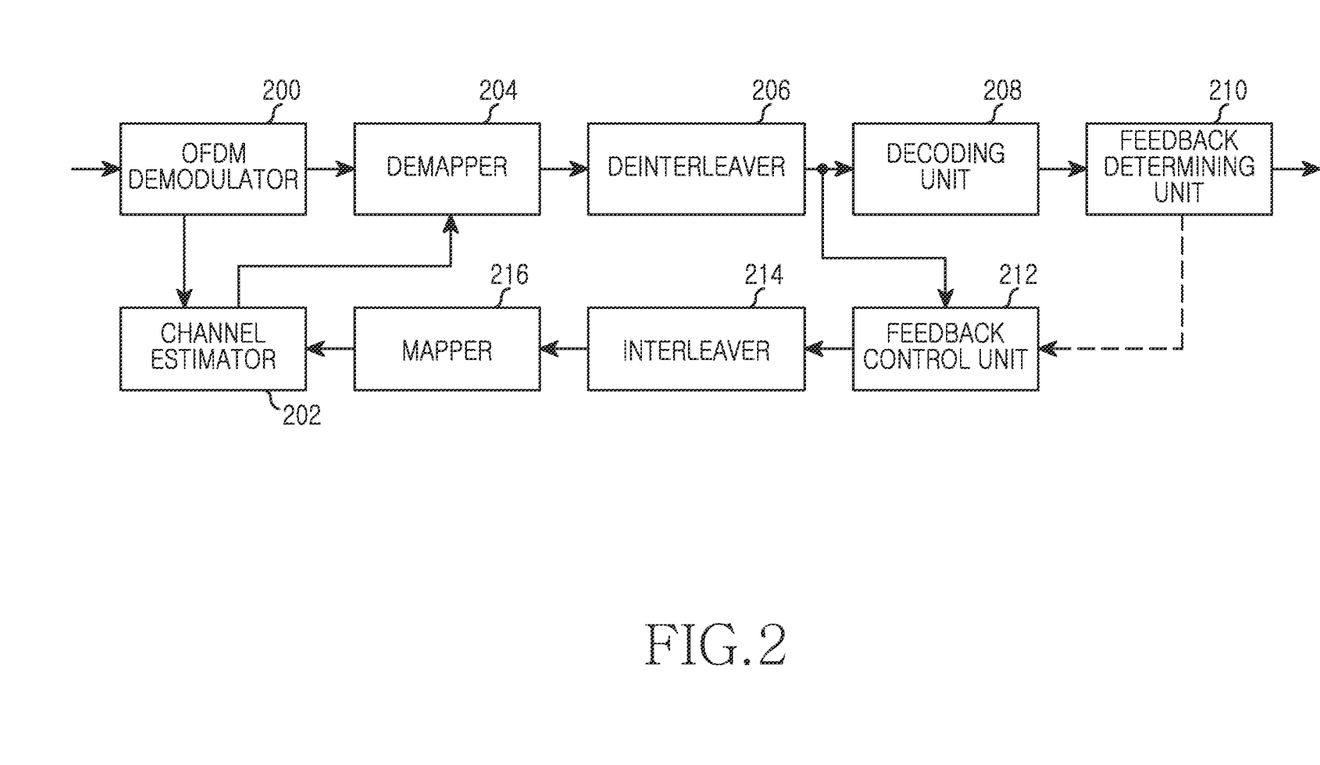
FIG. 2 is a block diagram illustrating a configuration of a receiver in a wireless communication system according to an embodiment of the present disclosure.

FIG. 2 is a block diagram illustrating a configuration of a receiver in a wireless communication system according to an embodiment of the present disclosure.

Referring to FIG. 2, the receiver may include an Orthogonal Frequency Division Multiplexing (OFDM) demodulator 200, a channel estimator 202, a demapper 204, a deinterleaver 206, a decoding unit 208, a feedback determining unit 210, a feedback control unit 212, an interleaver 214, and a mapper 216.

The OFDM demodulator 200 converts a time-domain signal, received through an antenna, into a frequency-domain signal. For example, the OFDM demodulator 200 converts a time-domain signal, received through an antenna, into a frequency-domain signal through a Fast Fourier Transform (FFT) operation.

The channel estimator 202 estimates a channel by using a pilot symbol received from the OFDM demodulator 200. Herein, the channel estimator 202 may estimate the channel by using at least one of a Least Square (LS) scheme, a Discrete Fourier Transform (DFT) scheme, and a Minimum Mean Square Error (MMSE) scheme. For example, the channel estimator 202 may perform an initial channel estimation according to the LS scheme by using Equation (1):

$$Y_{RS}(k) = H_{RS}(k)X_{RS}(k) + N_{RS}(k), k=1,2,\ldots M_p$$

$$\hat{H}_{RS}(k) = Y_{RS}(k)/X_{RS}(k) \quad \text{Equation (1)}$$

In Equation (1), $Y_{RS}(k)$ denotes a $k^{th}$ RX signal, $X^{RS}(k)$ denotes a $k^{th}$ TX signal, $N_{RS}(k)$ denotes a $k^{th}$ noise, $H_{RS}(k)$ denotes a frequency response of a $k^{th}$ channel, and $\hat{H}_{RS}(k)$ denotes a channel value that is a frequency response of the $k^{th}$ channel estimated by using an LS scheme.

After performing the initial channel estimation according to the LS scheme, the channel estimator 202 converts the pilot symbol into a time-domain signal. When the number of subcarriers of a band in use is not the square of 2, the channel estimator 202 converts the pilot symbol into a time-domain signal by padding 0 to a guard interval so that the number of subcarriers of the band is the square of 2. Herein, the channel estimator 202 may convert the pilot symbol into a time-domain signal by using at least one of an Inverse Fast Fourier Transform (IFFT) scheme, an Inverse Discrete Fourier Transform (IDFT) scheme, and a Discrete Cosine Transform (DCT) scheme.

Thereafter, the channel estimator 202 removes a noise by using Equation (2):

$$h(n) = \begin{cases} h(n), & |h(n)|^2 \geq \mu\sigma^2 \\ 0, & |h(n)|^2 < \mu\sigma^2 \\ 0, & n > \max \text{ delay} \end{cases} \quad \text{Equation (2)}$$

$$n = 0, 1, 2, \ldots, N-1, 1 \leq \mu$$

In Equation (2), h(n) denotes a channel value, μ denotes a threshold value for removing a noise component, $\sigma^2$ denotes a variance value, and $\mu\sigma^2$ denotes a power threshold value.

The channel estimator 202 may remove a noise by leaving channels more than a power threshold value in the time-domain signal by using Equation (2) and setting the other channels to 0. In this case, the channel estimator 202 may convert the noise-removed time-domain signal into a frequency-domain signal and calculate a channel estimation value as expressed in Equation (3):

$$\hat{H}_{Ini} = \text{FFT}(h) \quad \text{Equation (3)}$$

In Equation (3), $\hat{H}_{Ini}$ denotes a channel value that is estimated by using a pilot symbol, and FFT(h) denotes an FFT operation for converting a time-domain signal into a frequency-domain signal.

The demapper 204 calculates a Log Likelihood Ratio (LLR) value of a data signal received from the OFDM demodulator 200, by using a channel value estimated by the channel estimator 202. For example, the demapper 204 may calculate the LLR value by demodulating the data signal received from the OFDM demodulator 200, according to the channel value estimated by the channel estimator 202.

The deinterleaver 206 deinterleaves the LLR values received from the demapper 204 according to an interleaving rule.

The decoding unit 208 decodes the LLR value received from the deinterleaver 206. In this case, the decoding unit 208 outputs a decoded LLR value and a message bit. Herein, the message bit includes a Cyclic Redundancy Check (CRC) bit.

The feedback determining unit 210 determines whether to iteratively estimate the channel according to whether the decoding of the decoding unit 208 is successful. For example, the feedback determining unit 210 may determine whether the decoding of the decoding unit 208 is successful, by using the message bit received from the decoding unit 208. When the decoding of the decoding unit 208 is successful, the feedback determining unit 210 determines not to iteratively estimate the channel. On the other hand, when the decoding of the decoding unit 208 is not successful, the feedback determining unit 210 determines to iteratively estimate the channel. When determining to iteratively estimate the channel, the feedback determining unit 210 may control the feedback control unit 212 in order to feed back an input value of the decoding unit 208 for iterative channel estimation.

Figure 3:
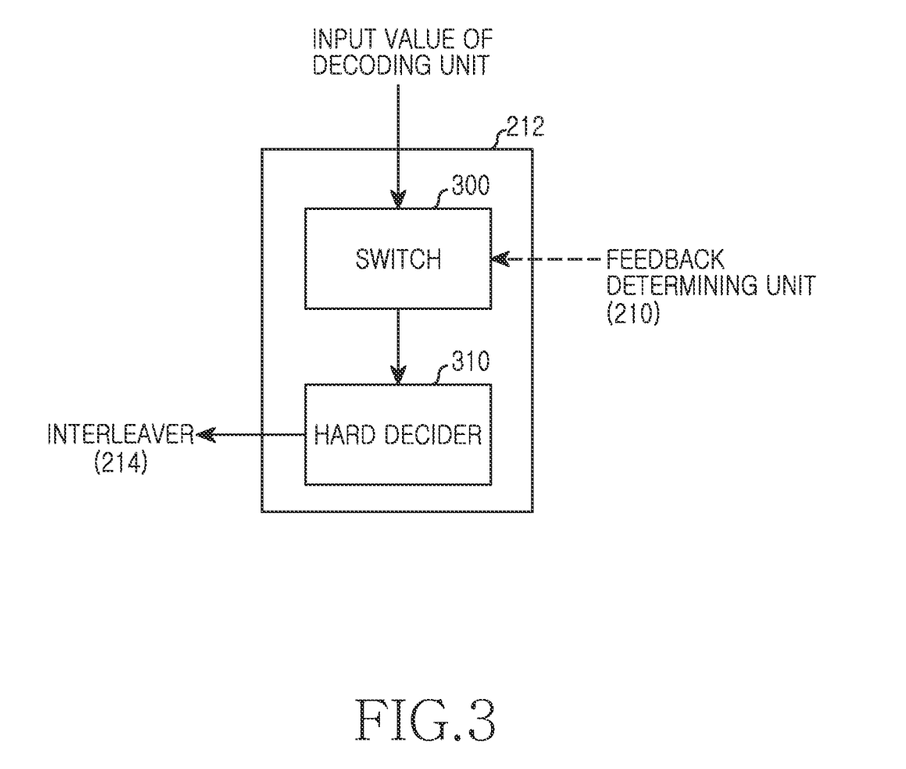
FIG. 3 is a block diagram illustrating a configuration of a feedback control unit according to an embodiment of the present disclosure.
Figure 4:
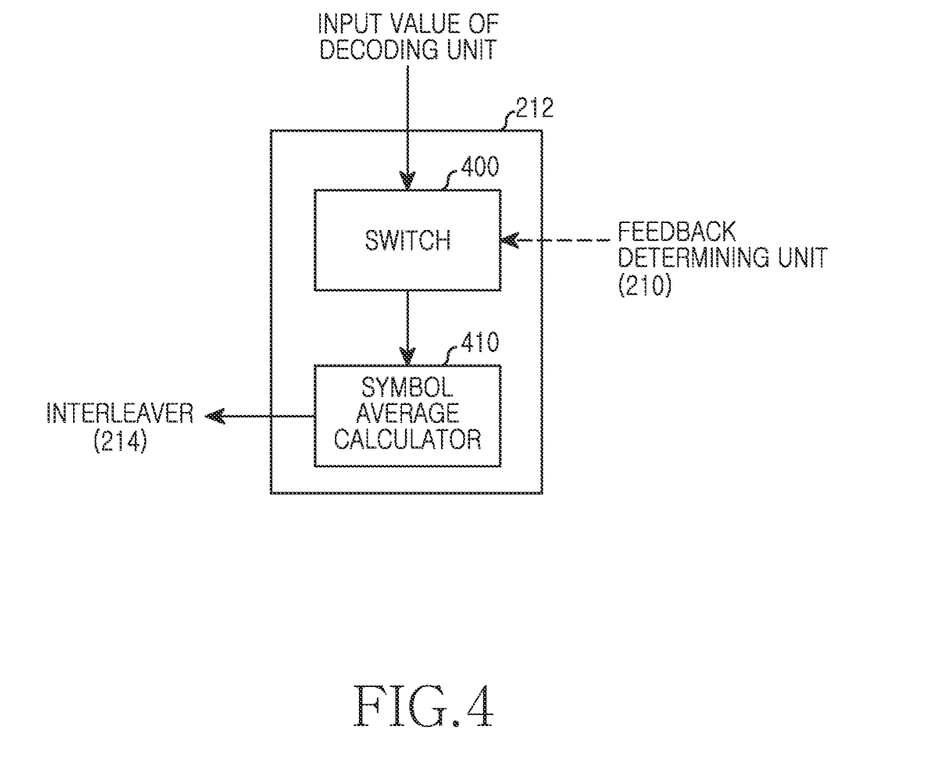
FIG. 4 is a block diagram illustrating a configuration of a feedback control unit according to an embodiment of the present disclosure.

When the feedback determining unit 210 determines to iteratively estimate the channel, the feedback control unit 212 converts the input value of the decoding unit 208 into a feedback signal. For example, as illustrated in FIG. 3, the feedback control unit 212 may include a hard decider 310 to perform a hard decision on an input LLR value of the decoding unit 208. As another example, as illustrated in FIG. 4, the feedback control unit 212 may include a symbol average calculator 410 to calculate an average value of data symbols by using the input LLR value of the decoding unit 208.

The interleaver 214 interleaves the signal received from the feedback control unit 212 according to an interleaving rule.

The mapper 216 generates a data symbol by modulating the signal interleaved by the interleaver 214 according to a modulation order.

The channel estimator 202 estimates the channel by using the data symbol by recognizing the data symbol generated by the mapper 216, as a pilot symbol. For example, the channel estimator 202 estimates the channel of the data symbol by using Equation (4):

$$Y_D(k)=H_D(k)X_D(k)+N_D(k), k=1,2,\ldots,M_p$$

$$\hat{H}_D(k)=Y_D(k)/X_D(k) \qquad \text{Equation (4)}$$

In Equation (4), $Y_D(k)$ denotes a $k^{th}$ RX signal, $X_D(k)$ denotes a $k^{th}$ TX signal, $N_D(k)$ denotes a $k^{th}$ noise, $H_D(k)$ denotes a frequency response of a $k^{th}$ channel, and $\hat{H}_D(k)$ denotes a channel value that is a frequency response of the $k^{th}$ channel estimated by using an LS scheme.

As described above, when the channel estimator 202 estimates the channel by using the pilot symbol and the fed-back data symbol, the channel estimator 202 may perform additional channel estimation on the band by using the channel estimation value of the pilot symbol and the channel estimation value of the data symbol. For example, the channel estimator 202 may perform additional channel estimation on the band by using the channel estimation value of the pilot symbol and the channel estimation value of the data symbol according to at least one of a DFT channel estimation scheme and an MMSE channel estimation scheme.

In this case, the receiver may demodulate and decode a signal by using the initial channel estimation value and the iterative channel estimation value of the channel estimator 202. Herein, the channel estimation value used in the receiver may be expressed as Equation (5):

$$\hat{H}=\alpha\hat{H}_{pre}+(1-\alpha)\hat{H}_{IDD}, 0\leq\alpha\leq1 \qquad \text{Equation (5)}$$

In Equation (5), $\hat{H}$ denotes a channel value used to demodulate and decode a signal in a receiver, $\hat{H}_{pre}$ denotes a channel value estimated by (i−1)-time iteration when a channel is estimated by i-time iteration, $\hat{H}_{IDD}$ denotes a channel value estimated by i-time iteration, and a denotes a weight value for determining a channel estimation value.

FIG. 3 is a block diagram illustrating a configuration of a feedback control unit according to an embodiment of the present disclosure.

Referring to FIG. 3, the feedback control unit 212 includes a switch 300 and the hard decider 310.

The switch 300 selectively provides the input value of the decoding unit 208 to the hard decider 310 according to whether the feedback determining unit 210 determines to iteratively estimate the channel. For example, when the feedback determining unit 210 determines not to iteratively estimate the channel, the switch 300 may perform switching such that the input value of the decoding unit 208 is not provided to the hard decider 310. On the other hand, when the feedback determining unit 210 determines to iteratively estimate the channel, the switch 300 may perform switching such that the input value of the decoding unit 208 is provided to the hard decider 310.

The hard decider 310 performs a hard decision on the input LLR value of the decoding unit 208, when receiving the input value of the decoding unit 208 through the switch 300.

In the above embodiment of the present disclosure, the feedback control unit 212 may include the switch 300 and the hard decider 310.

In another embodiment of the present disclosure, the feedback control unit 212 may include just the hard decider 310. In this case, when the feedback determining unit 210 determines to iteratively estimate the channel, the hard decider 310 is enabled to perform a hard decision on the input LLR value of the decoding unit 208.

FIG. 4 is a block diagram illustrating a configuration of a feedback control unit according to an embodiment of the present disclosure.

Referring to FIG. 4, the feedback control unit 212 includes a switch 400 and the symbol average calculator 410.

The switch 400 selectively provides the input value of the decoding unit 208 to the symbol average calculator 410 according to whether the feedback determining unit 210 determines to iteratively estimate the channel. For example, when the feedback determining unit 210 determines not to iteratively estimate the channel, the switch 400 may perform switching such that the input value of the decoding unit 208 is not provided to the symbol average calculator 410. On the other hand, when the feedback determining unit 210 determines to iteratively estimate the channel, the switch 400 may perform switching such that the input value of the decoding unit 208 is provided to the symbol average calculator 410.

The symbol average calculator 410 calculates an average value of data symbols by using the input LLR value of the decoding unit 208, when receiving the input value of the decoding unit 208 through the switch 400.

In the above embodiment of the present disclosure, the feedback control unit 212 may include the switch 400 and the symbol average calculator 410.

In another embodiment of the present disclosure, the feedback control unit 212 may include just the symbol average calculator 410. In this case, when the feedback determining unit 210 determines to iteratively estimate the channel, the symbol average calculator 410 is enabled to calculate the average value of data symbols by using the input LLR value of the decoding unit 208.

Figure 5:
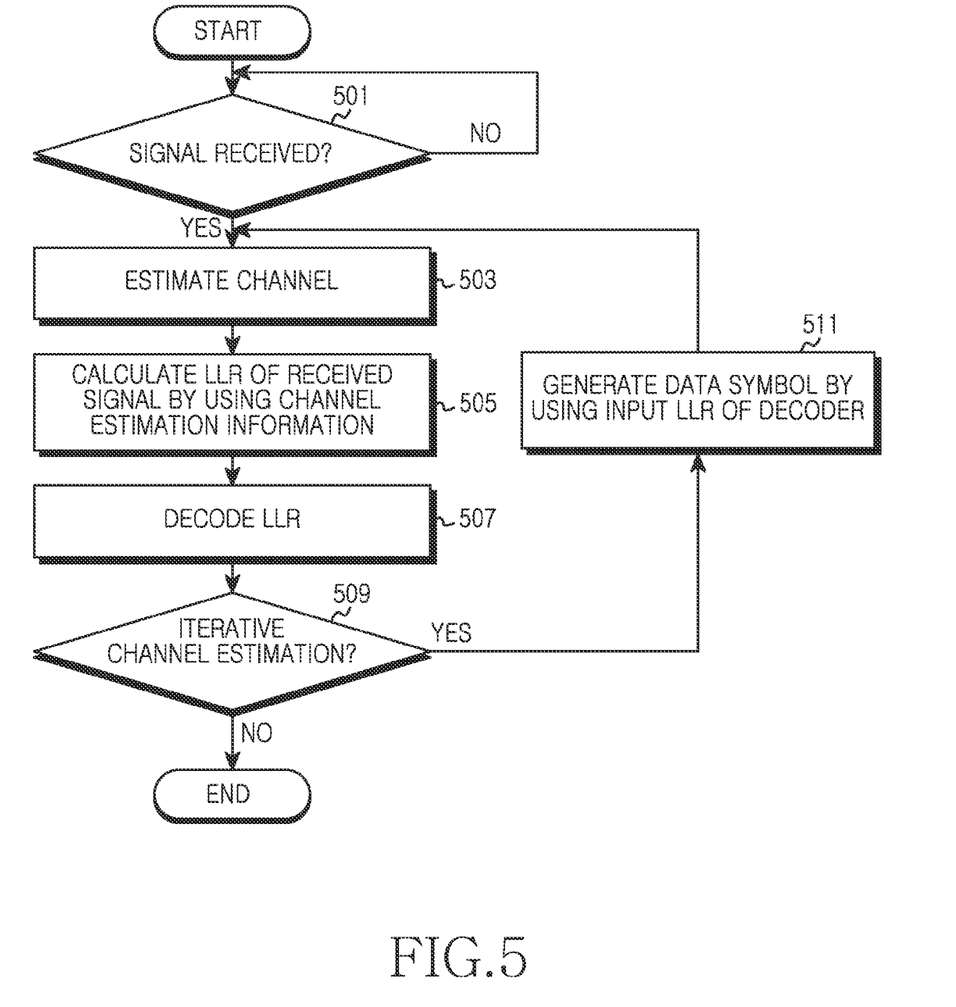
FIG. 5 is a flow diagram illustrating a process for decoding a signal in a receiver according to an embodiment of the present disclosure.

FIG. 5 is a flow diagram illustrating a process for decoding a signal in a receiver according to an embodiment of the present disclosure.

Referring to FIG. 5, in operation 501, the receiver determines whether a signal is received from a transmitter.

When a signal is received from a transmitter, the receiver proceeds to operation 503. In operation 503, the receiver estimates a channel by using a pilot signal included in the received signal. For example, when using an OFDM scheme, the receiver may convert the received signal into a frequency-domain signal through a FFT operation. Thereafter, the receiver may estimate the channel by using a pilot signal included in the frequency-domain signal. In this case, the receiver may estimate the channel by using at least one of an LS scheme, a DFT scheme, and an MMSE scheme.

Thereafter, in operation 505, the receiver calculates an LLR value of the received signal by using a channel value estimated in operation 503. For example, the receiver may calculate the LLR value by demodulating the frequency-domain signal according to the channel value estimated in operation 503.

Thereafter, in operation 507, the receiver decodes the LLR value. In this case, the receiver outputs a decoded LLR value and a message bit by decoding the LLR value. Herein, the message bit includes a CRC bit.

In operation 509, the receiver determines whether to iteratively estimate the channel. For example, the receiver may determine whether the decoding is successful, by using the message bit generated by the decoding. When the decoding of the LLR value is successful, the receiver determines not to iteratively estimate the channel. On the other hand, when the decoding of the LLR value is not successful, the receiver may determine to iteratively estimate the channel.

When determining to iteratively estimate the channel, the receiver proceeds to operation 511. In operation 511, the receiver generates a data symbol by using the LLR value input to a decoder for the decoding.

Thereafter, the receiver returns to operation 503 and estimates the channel by using the pilot symbol included in the received signal and the data symbol generated in operation 511. For example, the receiver may estimate the channel by using the data symbol by recognizing the data symbol generated in operation 511, as a pilot symbol. Thereafter, the receiver may perform additional channel estimation on a band in use by using the channel estimation value of the pilot symbol and the channel estimation value of the data symbol.

Thereafter, in operation 505, the receiver calculates an LLR value of the received signal by using a channel value estimated in operation 503. In this case, the receiver may calculate the LLR value by using the initial channel estimation value and the iterative channel estimation value. For example, as expressed in Equation 5, the receiver may calculate the LLR value of the received signal by using a previously-estimated channel value and a current channel value estimated through feedback.

On the other hand, when determining not to iteratively estimate the channel, the receiver ends the present algorithm.

Figure 6:
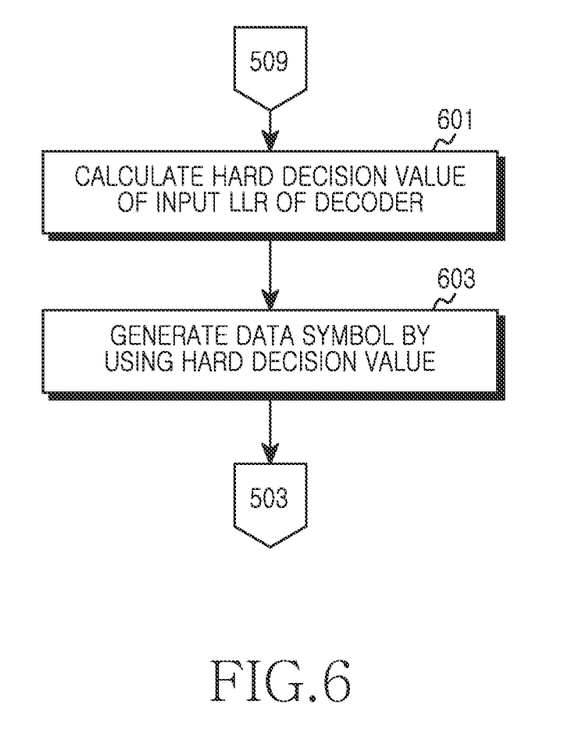
FIG. 6 is a flow diagram illustrating a process for iteratively estimating a channel in a receiver according to an embodiment of the present disclosure.

FIG. 6 is a flow diagram illustrating a process for iteratively estimating a channel in a receiver according to an embodiment of the present disclosure.

Referring to FIG. 6, when determining to iteratively estimate the channel in operation 509 illustrated in FIG. 5, the receiver proceeds to operation 601. In operation 601, the receiver performs a hard decision on the LLR value input to the decoder for the decoding.

In operation 603, the receiver generates a data symbol by using a hard decision value. For example, the receiver may interleave the hard decision value according to an interleaving rule. Thereafter, the receiver may estimate a data symbol by demodulating an interleaved signal according to a modulation order.

Thereafter, the receiver returns to operation 503 of FIG. 5 and estimates the channel by using the pilot symbol included in the received signal and the data symbol generated in operation 603. For example, the receiver may estimate the channel by using the data symbol by recognizing the data symbol generated in operation 603, as a pilot symbol. Thereafter, the receiver may perform additional channel estimation on the band by using the channel estimation value of the pilot symbol and the channel estimation value of the data symbol.

Figure 7:
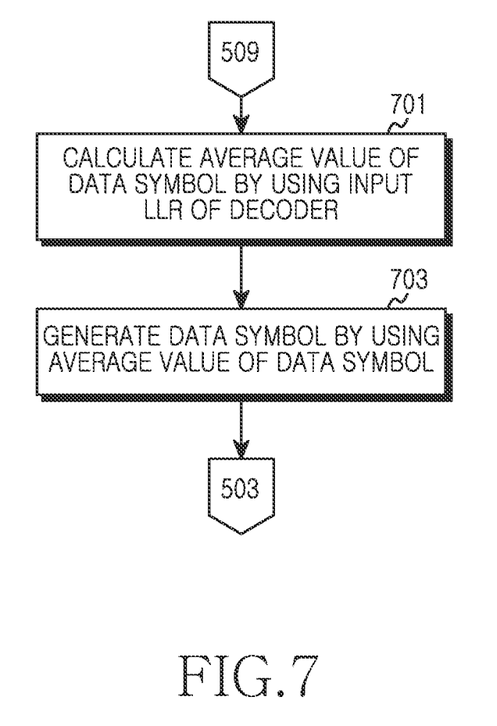
FIG. 7 is a flow diagram illustrating a process for iteratively estimating a channel in a receiver according to an embodiment of the present disclosure.

FIG. 7 is a flow diagram illustrating a process for iteratively estimating a channel in the receiver according to an embodiment of the present disclosure.

Referring to FIG. 7, when determining to iteratively estimate the channel in operation 509 illustrated in FIG. 5, the receiver proceeds to operation 701. In operation 701, the receiver calculates an average value of data symbols by using the LLR value input to the decoder for the decoding.

In operation 703, the receiver generates a data symbol by using the average value of data symbols. For example, the receiver may interleave the average value of data symbols according to an interleaving rule. Thereafter, the receiver may estimate a data symbol by demodulating an interleaved signal according to a modulation order.

Thereafter, the receiver returns to operation 503 of FIG. 5 and estimates the channel by using the pilot symbol included in the received signal and the data symbol generated in operation 703. For example, the receiver may estimate the channel by using the data symbol by recognizing the data symbol generated in operation 703, as a pilot symbol. Thereafter, the receiver may perform additional channel estimation on the band by using the channel estimation value of the pilot symbol and the channel estimation value of the data symbol.

Figure 8:
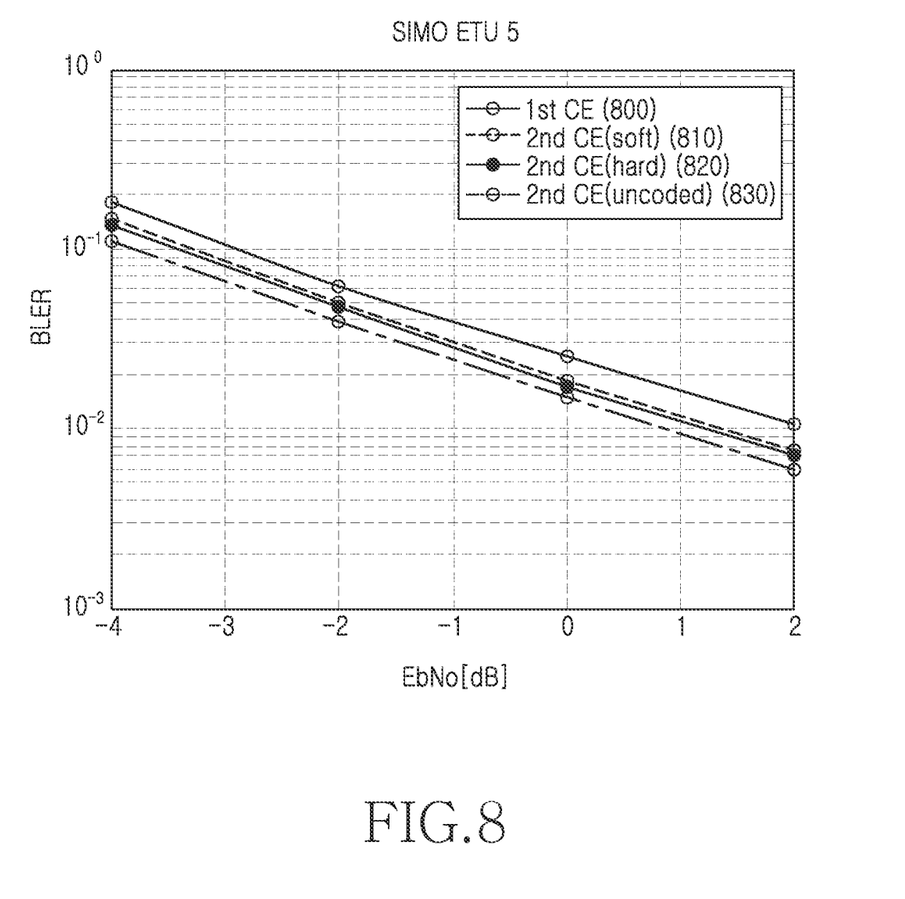
FIG. 8 is a graph illustrating a performance change according to an embodiment of the present disclosure.

FIG. 8 is a graph illustrating a performance change according to an embodiment of the present disclosure.

Referring to FIG. 8 may represent a Block Error Rate (BER) with respect to a signal-to-noise power ratio for each iterative channel estimation scheme in an experimental environment of 1×2 a Single Input Multiple Output (SIMO) scheme in an ETU 5 (Hz) channel.

Referring to FIG. 8, the receiver has a lower BER when an iterative channel estimation scheme (800/810/820) is used, than when an iterative channel estimation scheme is not used (830).

In addition, the receiver has a lower BER when using the first iterative channel estimation scheme 800 that feeds back the input value of the decoder, than when using the second iterative channel estimation scheme 810 and the third iterative channel estimation scheme 820 that feed back the output value of the decoder.

Figure 9:
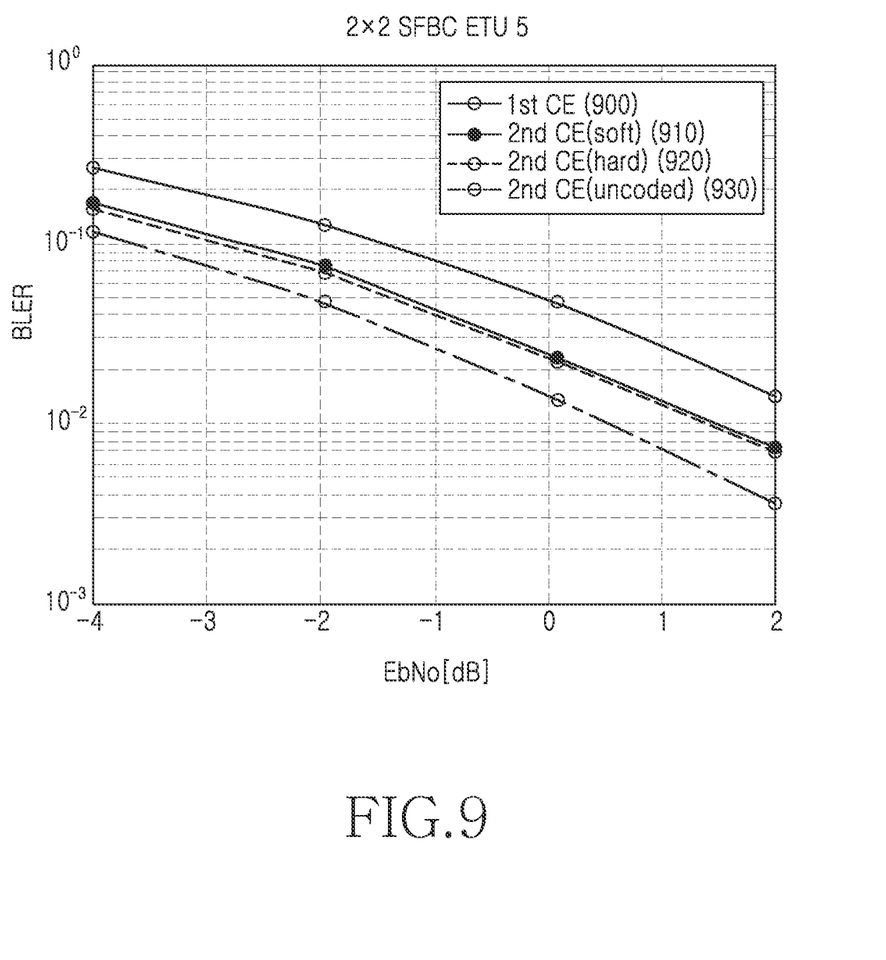
FIG. 9 is a graph illustrating a performance change according to an embodiment of the present disclosure.

FIG. 9 is a graph illustrating a performance change according to an embodiment of the present disclosure.

Referring to FIG. 9 may represent a BER with respect to a signal-to-noise power ratio for each iterative channel estimation scheme in an experimental environment of 2×2 a Space Frequency Block Coding (SFBC) scheme in an ETU 5 (Hz) channel.

Referring to FIG. 9, the receiver has a lower BER when an iterative channel estimation scheme (900/910/920) is used, than when an iterative channel estimation scheme is not used (930).

In addition, the receiver has a lower BER when using the first iterative channel estimation scheme 900 that feeds back the input value of the decoder, than when using the second iterative channel estimation scheme 910 and the third iterative channel estimation scheme 920 that feed back the output value of the decoder.

As described above, the channel estimation performance may be improved by iteratively estimating the channel in the wireless communication system.

In addition, by feeding back the input value of the decoder for iterative channel estimation in the wireless communication system, a feedback delay may be reduced by skipping an encoding process performed to feeding back the output value of the decoder, and an error in encoding the output value of the decoder may be reduced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus in a wireless communication system, the apparatus comprising:
   a channel estimator configured to estimate a first channel value based on at least one pilot symbols included in a received signal;
   a demapper configured to calculate a first value associated with the received signal by using the first channel value;
   a decoding unit configured to decode the first value;
   a feedback determining unit configured to determine whether to estimate a second channel value according to the decoding result; and
   a mapper configured to generate a data symbol based on the first value when the feedback determining unit determines to estimate the second channel value,
   wherein the channel estimator estimates the second channel value based on the at least one pilot symbol and the data symbol.

2. The apparatus of claim 1, wherein the feedback determining unit determines whether to estimate the second channel value based on Cyclic Redundancy Check (CRC) information received from the decoding unit.

3. The apparatus of claim 1, further comprising:
   a feedback device configured to determine a hard decision value by using the first value when the feedback determining unit determines to estimate the second channel value,
   wherein the mapper generates the data symbol based on the hard decision value.

4. The apparatus of claim 1, further comprising:
   a feedback device configured to determine an average value by using the first value when the feedback determining unit determines to estimate the second channel value,
   wherein the mapper generates the data symbol based on the average value.

5. The apparatus of claim 1, further comprising:
   a deinterleaver configured to deinterleave the first value,
   wherein the decoding unit decodes the deinterleaved first value.

6. The apparatus of claim 1, wherein the decoding unit determines to estimate the second channel value when the decoding result is unsuccessful.

7. The apparatus of claim 1, further comprising:
   a feedback device configured to convert the first value to a feedback signal when the feedback determining unit determines to estimate the second channel value; and
   an interleaver configured to interleave the feedback signal,
   wherein the mapper generates the data symbol based on the interleaved feedback signal.

8. The apparatus of claim 1, wherein the channel estimator estimates the first channel value by using at least one of a Least Square (LS) scheme, a Discrete Fourier Transform (DFT) scheme, and a Minimum Mean Square Error (MMSE) scheme.

9. The apparatus of claim 1, wherein the decoding unit decodes the received signal based on the first channel value and the second channel value.

10. The apparatus of claim 1, wherein the first value is a log likelihood ratio (LLR) value associated with the received signal.

11. A method in a wireless communication system, the method comprising:
    estimating a first channel value based on at least one pilot symbol included in a received signal;
    calculating a first value associated with the received signal by using the first channel value;
    decoding the first value;
    determining whether to estimate a second channel value according to the decoding result;
    generating a data symbol based on the first value when determining to estimate the second channel value; and
    estimating the second channel value based on the at least one pilot symbol and the data symbol.

12. The method of claim 11, wherein the determining of whether to estimate the second channel value comprises determining whether to estimate the second channel value based on Cyclic Redundancy Check (CRC) information generated by the decoding.

13. The method of claim 11, wherein the generating of the data symbol comprises:
    determining a hard decision value by using the first value when determining to estimate the second channel value; and
    generating the data symbol based on the hard decision value.

14. The method of claim 11, wherein the generating of the data symbol comprises:
    determining an average value by using the first value when determining to estimate the second channel value; and
    generating the data symbol based on the average value.

15. The method of claim 11, wherein the decoding of the first value comprises:
    deinterleaving the first value,
    decoding the deinterleaved first value.

16. The method of claim 11, wherein the determining of whether to estimate a second channel value comprises determining whether to estimate the second channel value when the decoding result is unsuccessful.

17. The method of claim 11, wherein the generating of the data symbol comprises:
    converting the first value to a feedback signal when determining to estimate the second channel value;

interleaving the feedback signal; and generating the data symbol based on the interleaved feedback signal.

18. The method of claim 11, wherein the estimating of the first channel value comprises estimating the first channel value by using at least one of a least square (LS) scheme, a discrete fourier transform (DFT), and a minimum mean square error (MMSE) scheme.

19. The method of claim 18, further comprising:

decoding the received signal based on the first channel value and the second channel value.

20. The method of claim 11, wherein the first value is a log likelihood ratio (LLR) value associated with the received signal.

* * * * *